(12) United States Patent
Kamamori

(10) Patent No.: US 12,548,132 B2
(45) Date of Patent: Feb. 10, 2026

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Yuki Kamamori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 18/173,915

(22) Filed: Feb. 24, 2023

(65) Prior Publication Data

US 2023/0289943 A1 Sep. 14, 2023

(30) Foreign Application Priority Data

Mar. 14, 2022 (JP) ................ 2022-039557

(51) Int. Cl.
*G06T 7/00* (2017.01)
*G06F 3/04847* (2022.01)
*G06T 5/70* (2024.01)

(52) U.S. Cl.
CPC ........ *G06T 7/0002* (2013.01); *G06F 3/04847* (2013.01); *G06T 5/70* (2024.01); *G06T 2200/24* (2013.01); *G06T 2207/20092* (2013.01); *G06T 2207/30184* (2013.01)

(58) Field of Classification Search
CPC ...... G06T 7/0002; G06T 5/70; G06F 3/04847
USPC ....................................................... 382/103
See application file for complete search history.

(56) References Cited

U.S. PATENT DOCUMENTS

| 11,314,721 | B1* | 4/2022 | Ma | G06F 16/2282 |
| 11,445,168 | B1* | 9/2022 | Wei | H04N 17/00 |
| 2018/0027250 | A1* | 1/2018 | Fram | H04N 19/157 382/131 |
| 2021/0302385 | A1* | 9/2021 | Jack | G01N 29/0654 |
| 2022/0358749 | A1* | 11/2022 | Yonetani | G06N 3/094 |
| 2024/0154971 | A1* | 5/2024 | Siswanto | G06F 3/0482 |
| 2024/0296537 | A1* | 9/2024 | Gai | G06T 7/11 |

FOREIGN PATENT DOCUMENTS

JP 2016121953 A 7/2016

* cited by examiner

*Primary Examiner* — William D Titcomb
(74) *Attorney, Agent, or Firm* — Venable LLP

(57) ABSTRACT

An information processing apparatus determines a group to which a user belongs. The user requests defect detection processing on an image of a structure, the information corresponding to the determined group to which the user belongs, and executes the defect detection processing on the image based on a particular configuration. The information refers to a storage that manages the information to be used in the configuring in association with a plurality of groups in which a user group that can use the information to be used in configuring the defect detection processing in a first mode when setting the configuration of the defect detection processing and in association with a user group that can use the information to be used in configuring the defect detection processing in a second mode different from the first mode when setting the configuration of the defect detection processing.

20 Claims, 16 Drawing Sheets

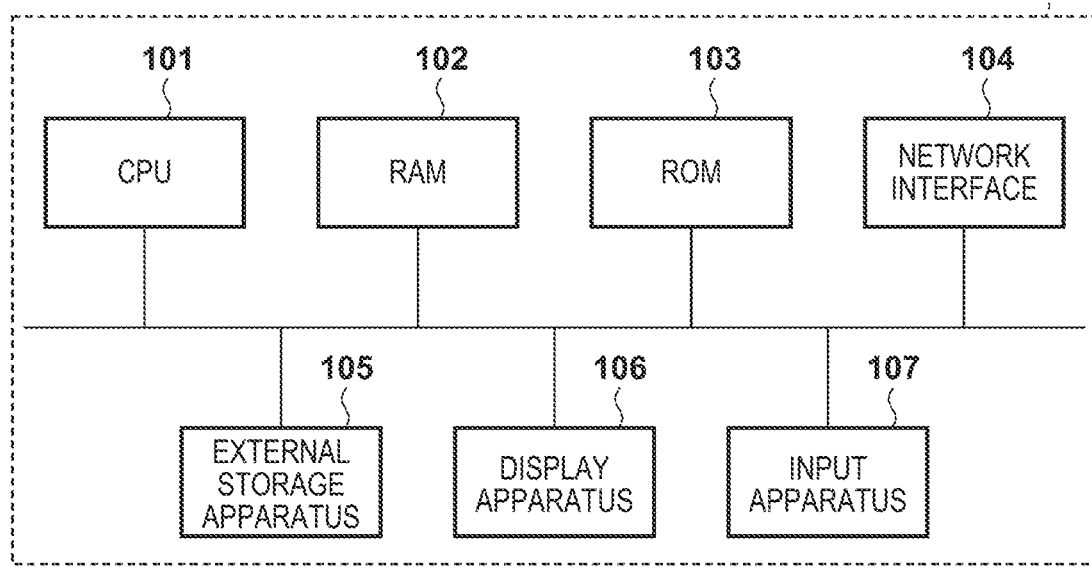
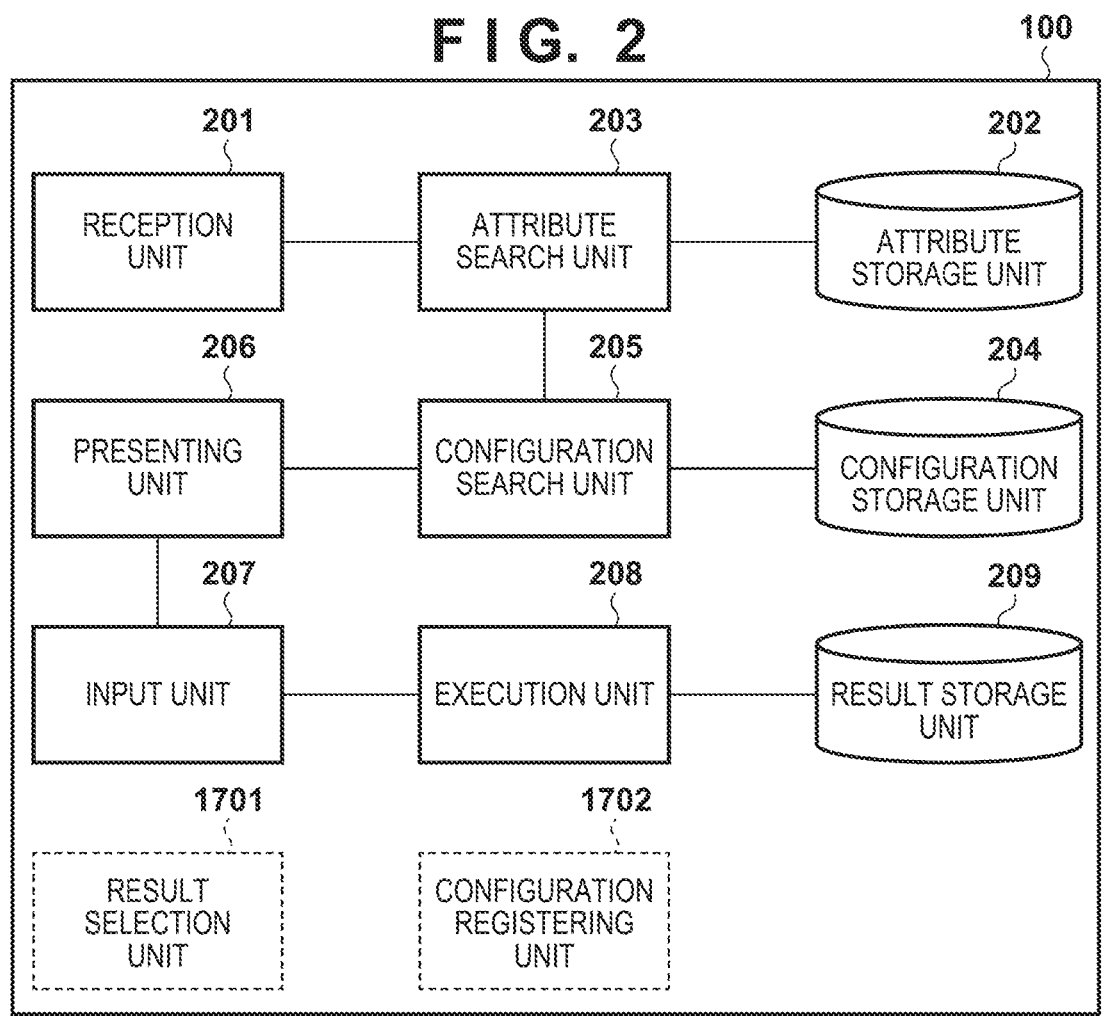

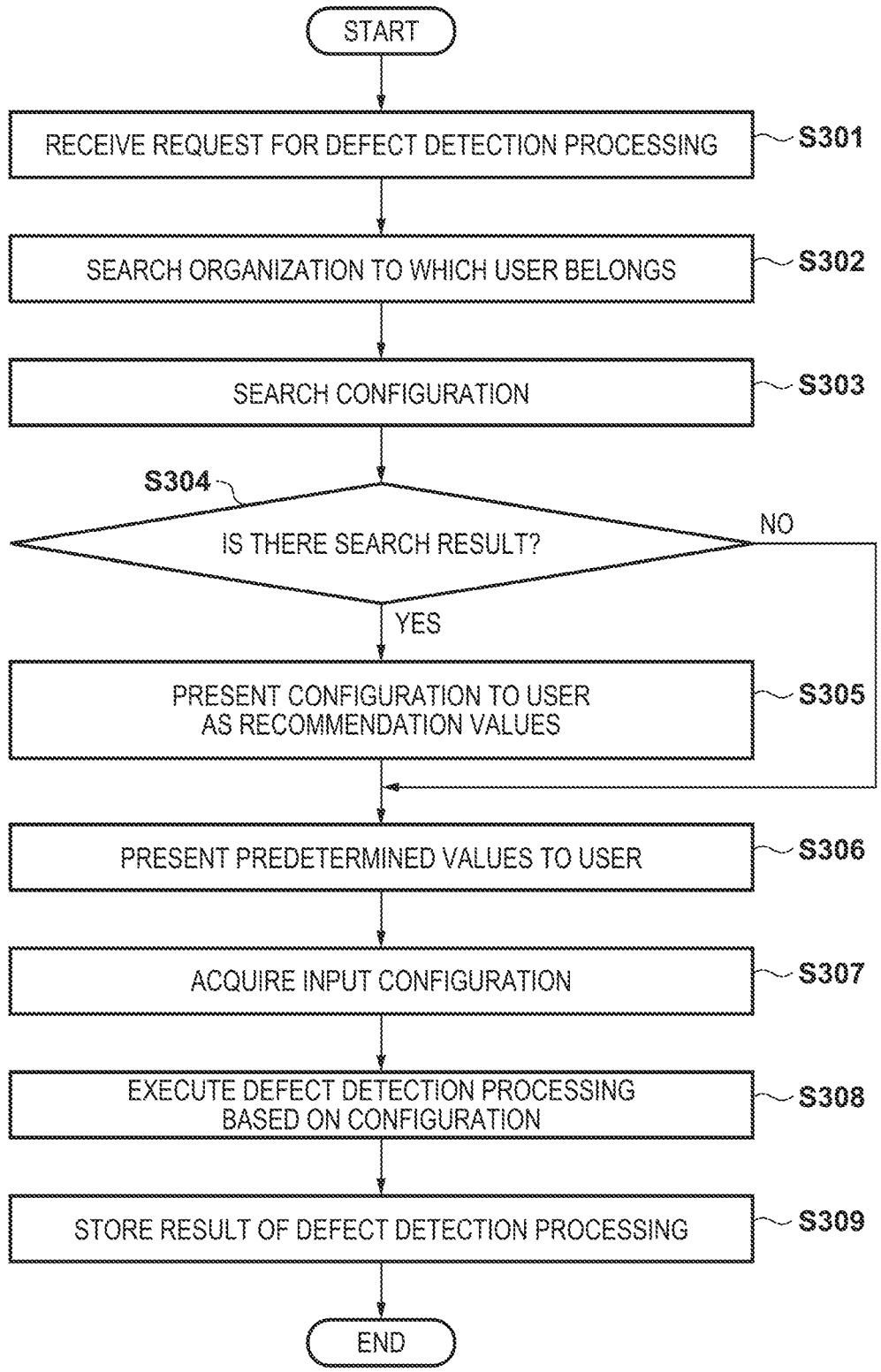

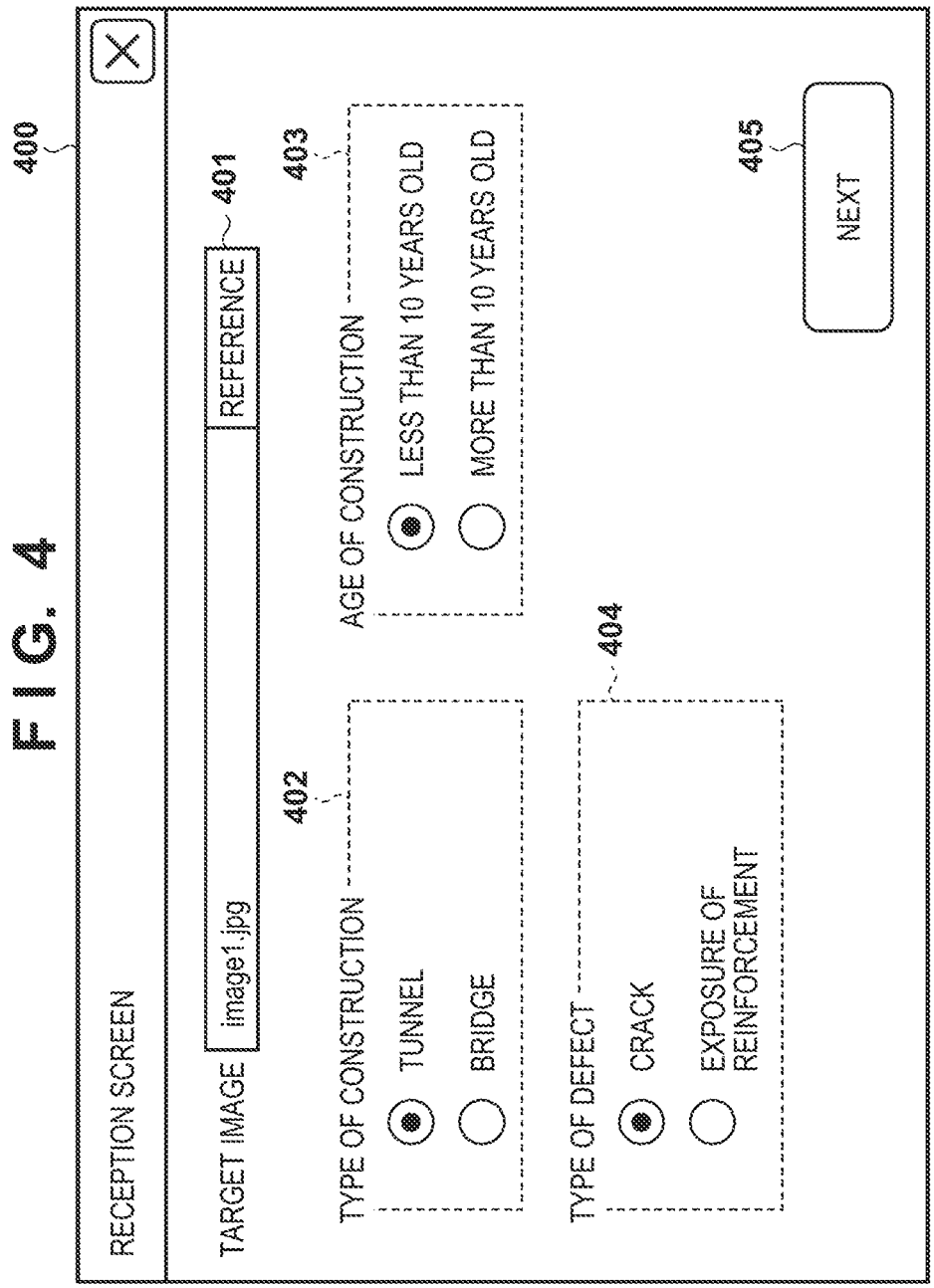

F I G. 5A

| USER ID | USER NAME | EMAIL ADDRESS | ORGANIZATION ID |
|---|---|---|---|
| user00001 | Sato Takuya | sato.t@aaa.com | org0001 |
| user00002 | Suzuki Daisuke | suzuki.d@aaa.com | org0001 |
| user00003 | Takahashi Ai | takahashi.a@bbb.com | org0002 |
| user00004 | Tanaka Mai | tanaka.m@bbb.com | org0002 |
| user00005 | Ito Naoki | ito.n@ccc.com | org0003 |
| ... | ... | ... | ... |

F I G. 5B

| ORGANIZATION ID | TYPE OF INFRASTRUCTURE CONSTRUCTION | AGE OF INFRASTRUCTURE CONSTRUCTION | TYPE OF DEFECT | ESTIMATION MODEL ID | DEFECT DETECTIVITY PARAMETER | NOISE REMOVAL PARAMETER |
|---|---|---|---|---|---|---|
| org0001 | TUNNEL | LESS THAN 10 YEARS OLD | CRACK | modelA | 3 | 2 |
| org0001 | TUNNEL | MORE THAN 10 YEARS OLD | CRACK | modelA | 5 | 3 |
| org0001 | TUNNEL | LESS THAN 10 YEARS OLD | EXPOSURE OF REINFORCEMENT | modelB | 6 | 5 |
| org0001 | BRIDGE | LESS THAN 10 YEARS OLD | CRACK | modelC | 3 | 3 |
| org0002 | TUNNEL | LESS THAN 10 YEARS OLD | CRACK | modelD | 4 | 5 |
| ... | ... | ... | ... | ... | ... | ... |

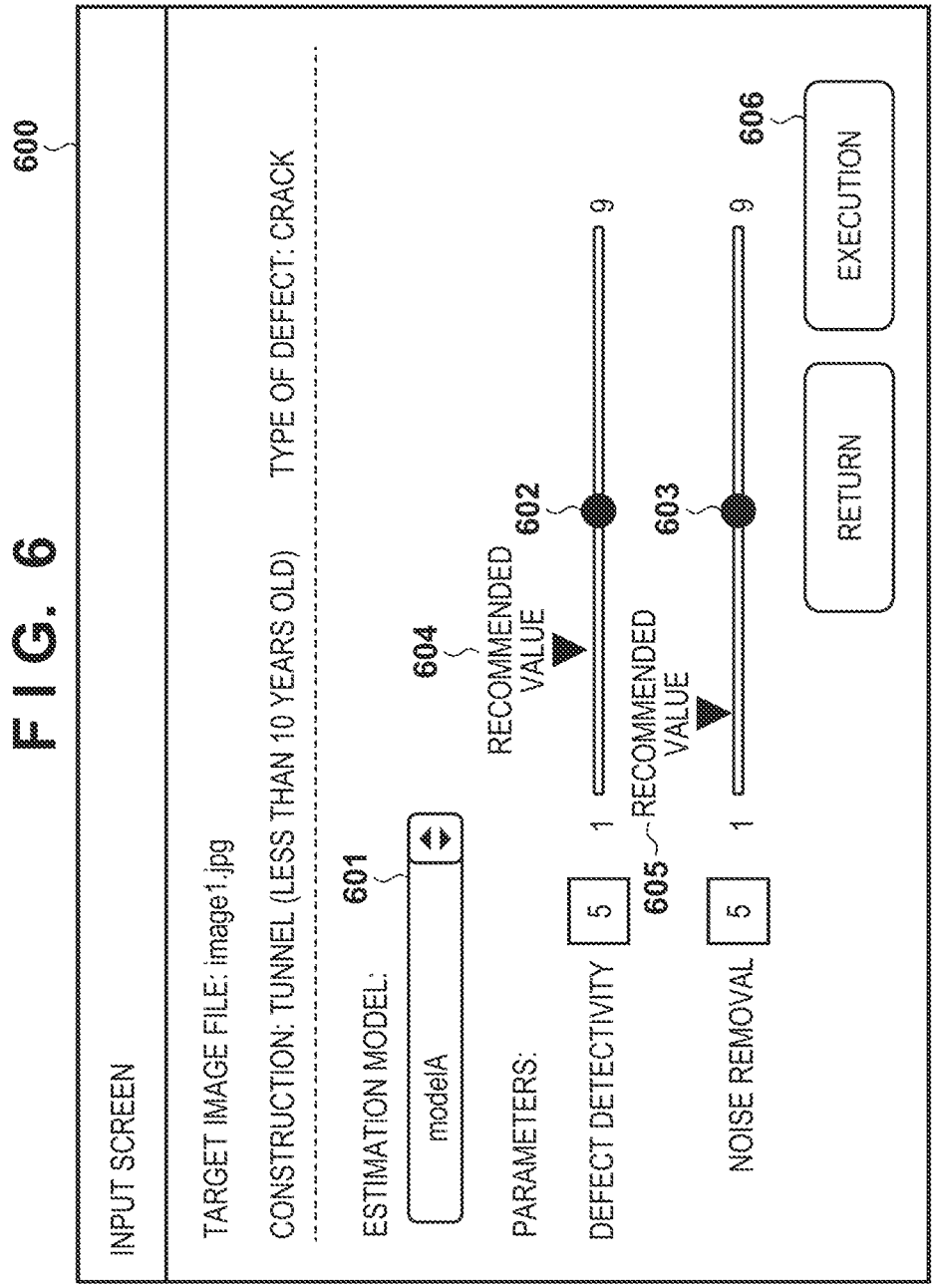

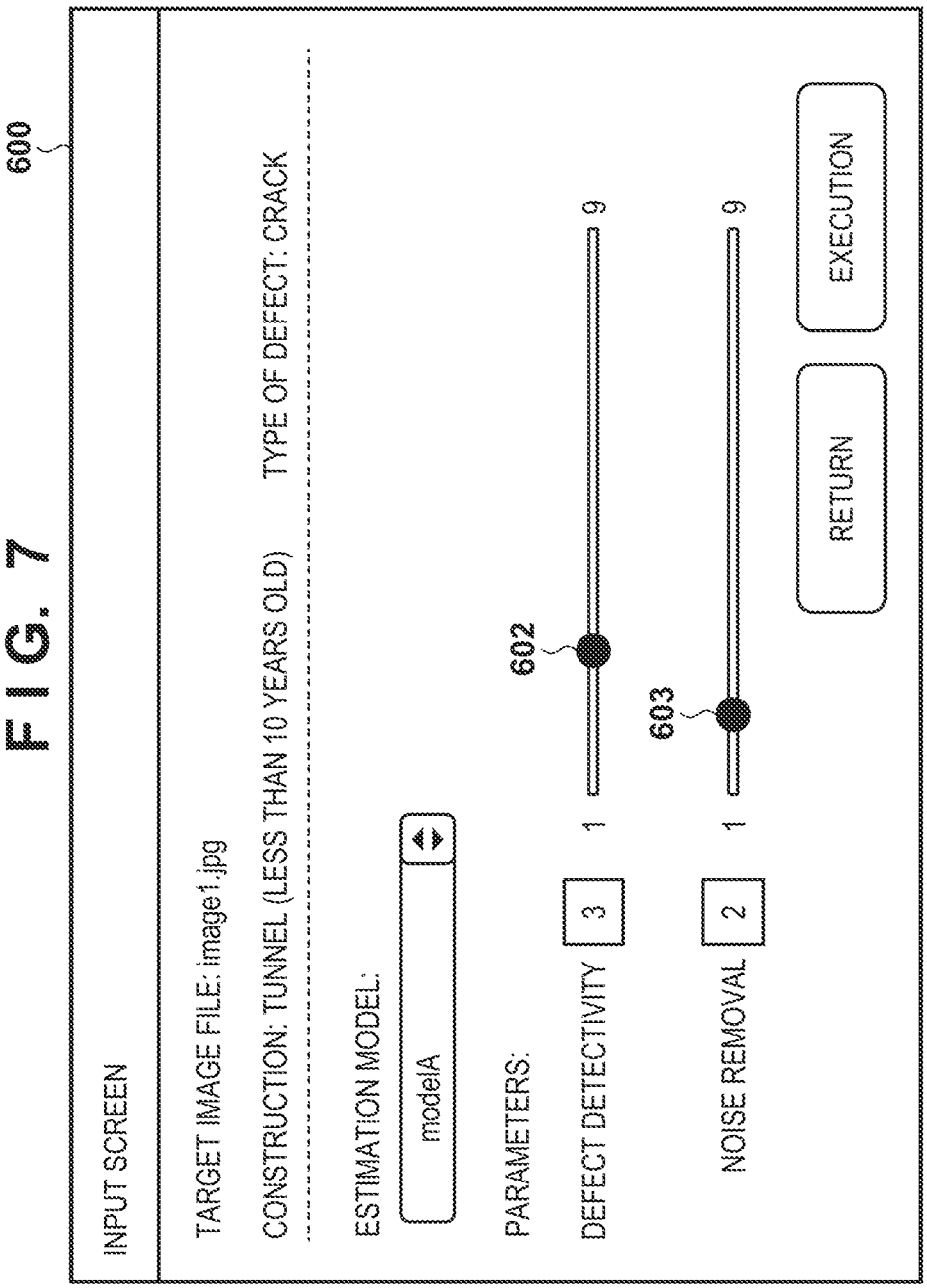

FIG. 8

| ORGANIZATION ID | DEFINITION NAMES OF CONFIGURATIONS | ESTIMATION MODEL ID | DEFECT DETECTIVITY PARAMETER | NOISE REMOVAL PARAMETER |
|---|---|---|---|---|
| org0001 | AA TUNNEL_CONFIGURATION FOR CRACK | modelA | 3 | 2 |
| org0001 | AA TUNNEL_CONFIGURATION FOR EXPOSURE OF REINFORCEMENT | modelA | 5 | 3 |
| org0001 | BB TUNNEL_CONFIGURATION FOR CRACK | modelB | 6 | 5 |
| org0001 | CC BRIDGE_CONFIGURATION FOR CRACK | modelC | 3 | 3 |
| org0002 | CONFIGURATION FOR XX TUNNEL (CRACK) | modelD | 4 | 5 |
| ... | ... | ... | ... | ... |

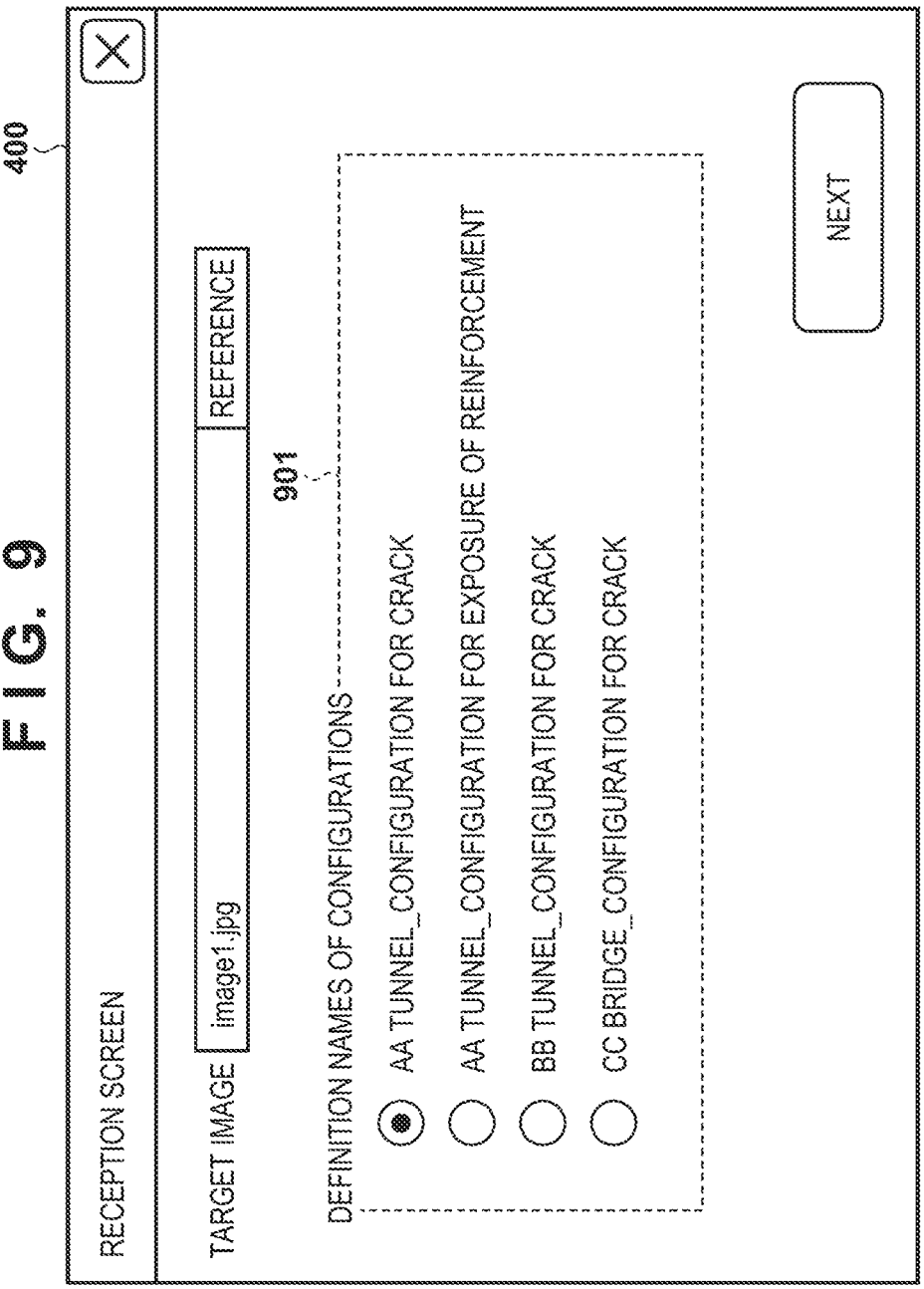

FIG. 10

| ORGANIZATION ID | TYPE OF INFRASTRUCTURE CONSTRUCTION | AGE OF INFRASTRUCTURE CONSTRUCTION | TYPE OF DEFECT | ESTIMATION MODEL ID | DEFECT DETECTIVITY PARAMETER | NOISE REMOVAL PARAMETER |
|---|---|---|---|---|---|---|
| org0001 | TUNNEL | LESS THAN 10 YEARS OLD | CRACK | modelA | 1-5 | 1-3 |
| org0001 | TUNNEL | MORE THAN 10 YEARS OLD | CRACK | modelA | 3-7 | 2-4 |
| org0001 | TUNNEL | LESS THAN 10 YEARS OLD | EXPOSURE OF REINFORCEMENT | modelB | 4-8 | 4-6 |
| org0001 | BRIDGE | LESS THAN 10 YEARS OLD | CRACK | modelC | 1-5 | 2-4 |
| org0002 | TUNNEL | LESS THAN 10 YEARS OLD | CRACK | modelD | 2-6 | 4-6 |
| ... | ... | ... | ... | ... | ... | ... |

F I G. 12A

| RESULT ID | ORGANIZATION ID | TYPE OF INFRASTRUCTURE CONSTRUCTION | AGE OF INFRASTRUCTURE CONSTRUCTION | TYPE OF DEFECT | CONFIGURATION | RESULT DATA | EXECUTION DATE AND TIME |
|---|---|---|---|---|---|---|---|
| res0001 | org0001 | TUNNEL | LESS THAN 10 YEARS OLD | CRACK | modelA,3,2 | [...] | 2020/1/1 00:00:00 |
| res0002 | org0001 | TUNNEL | LESS THAN 10 YEARS OLD | CRACK | modelA,5,3 | [...] | 2020/1/2 06:00:00 |
| res0003 | org0001 | TUNNEL | LESS THAN 10 YEARS OLD | CRACK | modelB,6,5 | [...] | 2020/1/3 12:00:00 |
| res0004 | org0002 | TUNNEL | LESS THAN 10 YEARS OLD | CRACK | modelD,4,5 | [...] | 2020/1/5 23:00:00 |
| ... | ... | ... | ... | ... | ... | ... | ... |

F I G. 12B

| USER ID | USER NAME | EMAIL ADDRESS | ORGANIZATION ID | REGISTRATION PRIVILEGE |
|---|---|---|---|---|
| user00001 | Sato Takuya | sato.t@aaa.com | org0001 | true |
| user00002 | Suzuki Daisuke | suzuki.d@aaa.com | org0001 | false |
| user00003 | Takahashi Ai | takahashi.a@bbb.com | org0002 | true |
| user00004 | Tanaka Mai | tanaka.m@bbb.com | org0002 | false |
| user00005 | Ito Naoki | ito.n@ccc.com | org0003 | true |
| ... | ... | ... | ... | ... |

| CONFIGURATION TO BE SHARED | ORGANIZATION ID TO BE SHARED |
|---|---|
| org0001-TUNNEL-LESS THAN 10 YEARS OLD-CRACK | org1001 |
| org0001-TUNNEL-LESS THAN 10 YEARS OLD-CRACK | org1002 |
| org0001-TUNNEL-LESS THAN 10 YEARS OLD-CRACK | org1003 |
| org0001-TUNNEL-LESS THAN 10 YEARS OLD-EXPOSURE OF REINFORCEMENT | org1001 |
| ... | ... |

FIG. 17

CONFIGURATION REGISTRATION SCREEN — 2000

TYPE OF CONSTRUCTION: TUNNEL — 2002
AGE OF CONSTRUCTION: LESS THAN 10 YEARS OLD
TYPE OF DEFECT: CRACK — 2001

RESULT LIST — 2003

☑ FILTER TO DISPLAY SAME IMAGE — 2004

RESULT PREVIEW

RESULT ID: res0002
EXECUTION DATE AND TIME: 2020/1/2 06:00:00

REGISTER CONFIGURATION WHEN THIS RESULT WAS OUTPUT?

REGISTRATION — 2005

INFORMATION PROCESSING APPARATUS, INFORMATION PROCESSING METHOD, AND MEDIUM

CROSS REFERENCE TO PRIORITY APPLICATION

This application claims the benefit of Japanese Patent Application No. 2022-039557, filed Mar. 14, 2022, which is hereby incorporated by reference herein in its entirety.

BACKGROUND OF THE INVENTION

Field of the Invention

The present invention relates to an information processing apparatus, an information processing method, and a storage medium and, in particular, relates to defect detection processing on images of a structure.

Description of the Related Art

Typically, when inspecting structures, such as bridges and tunnels, an inspection worker approaches a wall surface of the structure and visually examines and records defects such as cracks. The cost of such visual inspection work is high, and thus techniques have been developed to automatically detect defects using image processing or estimation processing from images captured of a wall surface of a structure. For example, in Japanese Patent Laid-Open No. 2016-121953, a method is described for detecting a crack region and an illumination region in a tunnel lining surface image via determination processing using a threshold for detecting the crack region and the illumination region.

SUMMARY OF THE INVENTION

According to an embodiment of the present invention, an information processing apparatus comprises one or more processors and one or more memories storing one or more programs that cause the one or more processors to determine a group to which a user belongs, wherein the user has requested defect detection processing on an image of a structure, to acquire information to be used in configuring the defect detection processing, the information corresponding to the group to which the user belongs, and to execute the defect detection processing on the image of the structure on a basis of a configuration for the defect detection processing configured through referring to the information acquired.

According to another embodiment of the present invention, an information processing method comprises determining a group to which a user belongs, wherein the user has requested defect detection processing on an image of a structure, acquiring information to be used in configuring the defect detection processing, the information corresponding to the group to which the user belongs, and executing the defect detection processing on the image of the structure on a basis of a configuration for the defect detection processing configured through referring to the information acquired.

According to still another embodiment of the present invention, a non-transitory computer-readable medium stores one or more programs that, when executed by a computer comprising one or more processors and one or more memories, cause the computer to determine a group to which a user belongs, wherein the user has requested defect detection processing on an image of a structure, to acquire information to be used in configuring the defect detection processing, the information corresponding to the group to which the user belongs, and to execute the defect detection processing on the image of the structure on a basis of a configuration for the defect detection processing configured through referring to the information acquired.

Further features of the present invention will become apparent from the following description of exemplary embodiments (with reference to the attached drawings).

BRIEF DESCRIPTION OF THE DRAWINGS

FIG. 1 is a block diagram illustrating an example of the hardware configuration of an information processing apparatus according to an embodiment.

FIG. 2 is a block diagram illustrating an example of the functional configuration of an information processing apparatus according to an embodiment.

FIG. 3 is a flowchart of an information processing method according to an embodiment.

FIG. 4 is a diagram illustrating an example of a screen for receiving a request for defect detection processing.

FIGS. 5A and 5B are diagrams illustrating examples of data structures for storing organizations and configurations.

FIG. 6 is a diagram illustrating an example of a screen for inputting a configuration.

FIG. 7 is a diagram illustrating an example of a screen for inputting a configuration.

FIG. 8 is a diagram illustrating an example of a data structure for storing configurations.

FIG. 9 is a diagram illustrating an example of a screen for receiving a request for defect detection processing.

FIG. 10 is a diagram illustrating an example of a data structure for storing configurations.

FIGS. 12A and 12B are diagrams illustrating examples of data structures for storing processing results, and the like.

FIG. 17 is a diagram illustrating an example of a screen for registering a configuration.

DESCRIPTION OF THE EMBODIMENTS

Figure 11:
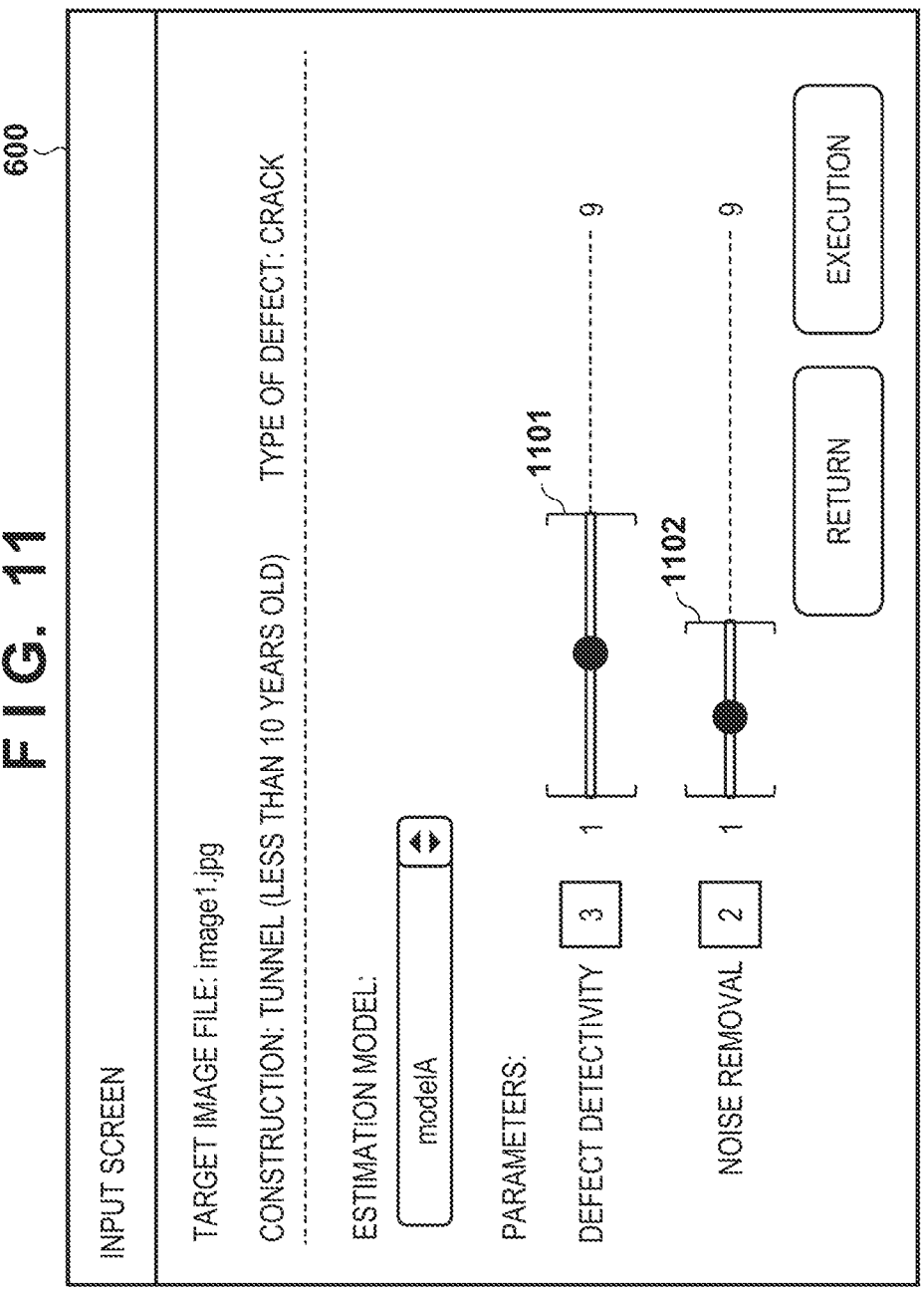
FIG. 11 is a diagram illustrating an example of a screen for inputting a configuration.

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and a redundant description thereof is omitted.

The configuration used in defect detection processing influences the result of the processing. Thus, there is a need for a configuration to be selected that is appropriate for the defect detection processing. However, the criterion for inspection tends to differ depending on what is being inspected. For example, the criterion for inspection changes depending on the sensitivity and experience of the inspection worker or the in-company criteria or standards of the inspection company. Also, within an inspection company, it is desirable to reduce variation in inspection criteria between inspection workers and to make inspections in the organization with a uniform quality.

According to an embodiment of the present invention, regarding structure inspection using defect detection processing of an image of a structure, the uniformity of the quality of inspections in the organization can be increased.

An example of the hardware configuration of an information processing apparatus according to an embodiment of the present invention will now be described with reference to the block diagram of FIG. 1. An information processing apparatus 100 includes a CPU 101, a RAM 102, a ROM 103, a network interface 104, an external storage apparatus 105, a display apparatus 106, and an input apparatus 107. The functions described below of the units illustrated in FIG. 2, and the like, can be implemented by a processor such as the CPU 101 executing a program stored in a memory, such as the RAM 102, the ROM 103, or the external storage apparatus 105. Such a memory can store a computer program or data for the CPU 101 to execute the processing executed by the information processing apparatus described below.

The CPU 101 can execute the program as described above and can perform operation control of the units forming the information processing apparatus. The RAM 102 is a memory that temporarily stores data or control information and provides a working area used when the CPU 101 executes the various processing. The ROM 103 stores fixed operational parameters, operation programs, or the like, used by the information processing apparatus. The network interface 104 provides the function of connecting to and communicating with a network. The information processing apparatus can exchange data with an external apparatus via the network interface 104. The external storage apparatus 105 is an apparatus that stores data. The external storage apparatus 105 has an interface for receiving I/O commands for reading and writing data. The external storage apparatus 105 may be a hard disk drive (HDD), a solid state drive (SSD), an optical disk drive, a semiconductor storage apparatus, or a similar storage apparatus. The display apparatus 106 is a Liquid Crystal Display (LCD), for example, and can display information required by a user. The input apparatus 107 is a keyboard, a mouse, a touch panel, or the like, for example, and can receive the required input for a user.

Next, an example of the functional configuration of the information processing apparatus according to the present embodiment will be described with reference to the block diagram of FIG. 2. The information processing apparatus 100 includes a reception unit 201, a configuration search unit 205, and an execution unit 208. The reception unit 201 receives a request from the user for defect detection processing of an image of a structure. The reception unit 201, for example, can receive a request from a user to detect defects in an image captured of an infrastructure construction, such as a tunnel or a bridge.

The configuration search unit 205 references data indicating an association between the group of a user and a configuration for the defect detection processing and obtains the configuration for the defect detection processing corresponding to the group of a user. In the present embodiment, the information processing apparatus 100 further includes an attribute storage unit 202, an attribute search unit 203, and a configuration storage unit 204.

The attribute storage unit 202 stores information indicating the group of the user. For example, the attribute storage unit 202 can store information indicating the attributes of each user and, in this case, can set the user groups according to the attributes of the users. The users can be grouped according to attribute. In the present embodiment, the attribute storage unit 202 stores information indicating the organization the user belongs to as the information indicating the attribute of the user.

The attribute search unit 203 determines the group of the user who has requested the defect detection processing of an image of a structure. The attribute search unit 203 can reference the attribute storage unit 202 and identify the group to which the user belongs. For example, the attribute search unit 203 can search and retrieve from the attribute storage unit 202 the organization of the user who has requested the defect detection processing.

The configuration storage unit 204 manages the information associated with the user groups used in configuring the defect detection processing. For example, the configuration storage unit 204 can store data of the association between the group of a user and a configuration for the defect detection processing. The configuration storage unit 204 may associate a configuration for defect detection processing with an organization and store the configuration. For example, the configuration storage unit 204 can manage information to be used in associating together the user groups and the type of defect or characteristic of the structure to be detected and used in configuring the defect detection processing. The characteristic of the structure may be at least one of the type of structure or the age of the structure. In the present embodiment, the configuration storage unit 204 associates a configuration with the organization as well as the type of infrastructure construction, the infrastructure construction age, and the type of defect. According to such a configuration, even when the inspection criterion is different depending on the characteristic of the structure and the type of defect, appropriate configurations can be used.

The configuration search unit 205 acquires information for identifying the group of the user who has requested the defect detection processing from the attribute search unit 203. Also, the configuration search unit 205 acquires information to be used in configuring the defect detection processing corresponding to the group to which the user belongs from the configuration storage unit 204. For example, the configuration search unit 205 can acquire information to be used in configuring the defect detection processing corresponding to the group to which the user belongs and the type of defect or the characteristic of the structure. In the present embodiment, the configuration search unit 205 acquires a configuration for the defect detection processing. For example, the configuration search unit 205 acquires, from the configuration storage unit 204, the configuration associated with the organization of the user who requested the defect detection processing, the type of infrastructure construction that is the target of the defect detection processing, the infrastructure construction age, and the type of defect.

The execution unit 208 executes defect detection processing on an image of a structure in accordance with a configuration for the defect detection processing configured through referring to the information acquired by the configuration search unit 205. In the present embodiment, the information processing apparatus 100 may further include a presenting unit 206 and an input unit 207. The presenting unit 206 presents to the user the information acquired by the configuration search unit 205. Also, the input unit 207 receives user input indicating a configuration for the defect detection processing after the presenting unit 206 has presented the information to the user. Furthermore, the execution unit 208 executes defect detection processing on an image of a structure in accordance with the configuration according to the user input performed after referencing the information acquired by the configuration search unit 205. As described below, the presenting unit 206 can present to the user a recommended value or an initial value for the configuration for the defect detection processing based on the information acquired by the configuration search unit 205. In the present embodiment, the presenting unit 206 presents to the user recommended values for the configuration acquired by the configuration search unit 205. The user may input a configuration while referencing the recommended value presented by the presenting unit 206, may input an instruction indicating intent to use the recommended value presented by the presenting unit 206, and may input an instruction to adjust the recommended value presented by the presenting unit 206.

The information processing apparatus 100 may further include a result storage unit 209. The result storage unit 209 stores the result of the defect detection processing executed by the execution unit 208. At this time, the result storage unit 209 can store the result of the defect detection processing as well as the configuration used by the execution unit 208. For example, the result storage unit 209 can associate the result of the defect detection processing executed by the execution unit 208 with the configuration for the defect detection processing and store them.

Next, an information processing method executed by the information processing apparatus according to the present embodiment will be described with reference to the flowchart of FIG. 3. First, in step S301, the reception unit 201 receives a request from the user for defect detection processing of an image of a structure. FIG. 4 illustrates an example of a user interface (UI) 400 used for receiving such a defect detection processing request. The UI 400 includes a form 401 for specifying the image file of the infrastructure construction that is the target of the defect detection processing. Also, the UI 400 includes forms 402 to 404 for specifying the type of infrastructure construction that is the target of the defect detection processing, the infrastructure construction age, and the type of defect. The UI 400 further includes a button 405 for receiving a request for defect detection processing based on that specified in the forms 401 to 404.

In an embodiment, the UI 400 illustrated in FIG. 4 is displayed on a terminal used by the user. The data of the UI 400 may be sent from the reception unit 201 to the terminal used by the user and displayed on a web browser on the terminal. When the user performs input to the forms 401 to 404 on the UI 400 and presses the button 405, the image file of the infrastructure construction together with the information input into the forms 402 to 404 are transmitted to the reception unit 201. In this manner, a defect detection processing request can be communicated from the terminal of the user to the reception unit 201. At this time, the reception unit 201 can acquire authentication information (for example, the user ID) of the user from the terminal used by the user.

Next, in step S302, the attribute search unit 203 identifies the group of the user who has requested the defect detection processing. In the present embodiment, the attribute search unit 203 searches and retrieves the organization to which the user belongs from the attribute storage unit 202. FIG. 5A illustrates an example of the attributes of users stored by the attribute storage unit 202. The attribute storage unit 202 can associate the user name of the user, the email address of the user, and an organization ID for uniquely identifying the organization to which the user belongs with a user ID for uniquely identifying the user and store them. The attribute search unit 203 can identify the user ID of the user who requested a defect detection processing on the basis of the authentication information, and the like, included in the communication to request a defect detection processing. In this case, the attribute search unit 203 can search and retrieve the organization of the user using the user ID as a query. In the example in FIG. 5A, the organization ID of the organization the user with the user ID of "user00001" belongs to is "org0001".

Next, in step S303, the configuration search unit 205 acquires, from the configuration storage unit 204, the configuration for the defect detection processing corresponding to the group identified in step S302. In the present embodiment, the configuration search unit 205 acquires, from the configuration storage unit 204, the configuration associated with the organization of the user who requested the defect detection processing, the type of infrastructure construction that is the target of the defect detection processing, the infrastructure construction age, and the type of defect.

FIG. 5B illustrates an example of a configuration stored by the configuration storage unit 204. The configuration storage unit 204 associates combinations of the organization ID, the type of infrastructure construction, the infrastructure construction age, and the type of defect with configurations, and stores them. A configuration according to the present embodiment includes an estimation model ID for uniquely identifying an estimation model, a defect detectivity parameter, and a noise removal parameter. In the present specification, the defect detectivity parameter is a parameter for controlling how many defects are detected in the defect detection processing (for example, making defects easier to detect or harder to detect). Also, the noise removal parameter indicates the strength of the noise removal processing, which is a preprocessing executed on an image of a structure. In this manner, the information to be used in configuring the defect detection processing can include information for identifying the estimation model used in the defect detection processing. Also, the information to be used in configuring the defect detection processing can include defect detection processing parameters. Furthermore, the information to be used in configuring the defect detection processing can include parameters for the image processing executed on an image of a structure.

The configuration search unit 205 can search for the corresponding configuration using the organization ID acquired in step S302 and the type of infrastructure construction, the infrastructure construction age, and the type of defect acquired in step S301 as a query. For example, in the example in FIG. 5B, the configuration corresponding to tunnel, less than ten years old, and crack of the organization with the organization ID of "org0001" corresponds to "modelA" for the estimation model ID, "3" for the defect detectivity parameter, and "2" for the noise removal parameter.

When a configuration has been retrieved in step S304, the processing proceeds to step S305, and when a configuration cannot be retrieved, the processing proceeds to step S306. In step S305, the presenting unit 206 presents to the user the configuration retrieved in step S304. In the present embodiment, the presenting unit 206 presents to the user the configuration retrieved in step S304 as recommended values for the configuration. Then, the processing proceeds to step S306.

In step S306, the presenting unit 206 presents to the user initially registered predetermined values as specified values for the configuration. FIG. 6 illustrates an example of a UI 600 including a region for a display based on the information acquired by the configuration search unit 205 and a region for receiving user input indicating the configuration for the defect detection processing. The UI 600 illustrated in FIG. 6 is for presenting the recommended values for the configuration used in the defect detection processing and acquiring user input to specify the configuration. The presenting unit 206 can present to the user the UI 600.

The UI 600 includes a form 601 for selecting the estimation model to be used in the defect detection processing. In this example, the UI 600 is presented with "modelA" initially selected in the form 601 as the estimation model ID retrieved in step S305. The UI 600 also includes sliders 602 and 603 for selecting the defect detectivity parameter and the noise removal parameter to be used in the defect detection processing. The UI 600 is displayed with the sliders 602 and 603 initially set to "5", the initially registered specified value. Also, the UI 600 includes markers 604 and 605 presenting the recommended values for the defect detectivity parameter and the noise removal parameter retrieved in step S304. In the example in FIG. 6, the markers 604 and 605 are set to the recommended values of "3" for the defect detectivity parameter and "2" for the noise removal parameter and presented to the user. The UI 600 includes a button 606 for executing the defect detection processing.

In step S307, the input unit 207 acquires the configuration to be used in the defect detection processing specified by the user. The user can specify the configuration by performing input using the form 601 and the sliders 602 and 603. At this time, the user can reference the estimation model ID and the recommended values for the parameters presented on the UI 600, and determine and input the estimation model ID and parameters to be used in the defect detection processing.

Note that similar to the UI 400, the UI 600 may be displayed on a terminal used by the user. The data of the UI 600 may be sent from the presenting unit 206 to the terminal used by the user and displayed on a web browser on the terminal. When the user specifies the configuration on the UI 600 and presses the button 606, the configuration is transmitted to the input unit 207.

Next, in step S308, the execution unit 208 uses the configuration acquired in step S307 and executes the defect detection processing on an image of a structure. Lastly, in step S309, the execution unit 208 stores, in the result storage unit 209, the result of the defect detection processing obtained in step S308 and the configuration acquired in step S307.

In this manner, in the present embodiment, the configuration for the defect detection processing corresponding to the group to which the user belongs is presented. According to such a configuration, a configuration for the defect detection processing can be shared within an organization and managed. Furthermore, by presenting a shared configuration to a user, the user can reference the configuration and execute defect detection processing. This makes it easier to make the quality of the inspections of structures uniform within an organization.

In the example described above, a configuration associated with the organization to which the user belongs is presented. However, the user group or attribute may not be related to an organization. For example, a configuration may be associated with the user's occupation, subscription service, or the like.

Also, in the example described above, the estimation model ID, the defect detectivity parameter, and the noise removal parameter are associated with the attributes of the user as a configuration. However, the type of configuration is not limited thereto, and other estimation processing parameters or image processing parameters may be associated with the attributes of the user, for example.

Also, in the example described above, after the configuration acquired by the configuration search unit 205 is presented to the user, defect detection processing based on the configuration input by the user is executed. However, the method of using the acquired configuration is not limited to this method. For example, defect detection processing using a configuration acquired by the configuration search unit 205 may be executed without any presentation to the user or user input. In other words, the execution unit 208 may execute the defect detection processing on an image of a structure in accordance with the configuration indicated by the information acquired by the configuration search unit 205. According to such a configuration, variation in the configuration caused by users adjusting the configuration each time the defect detection processing is executed can be suppressed, enabling the quality of inspections of structure to be made more uniform within an organization.

Also, in the example described above, in addition to specified values for the configuration, recommended values for the configuration acquired by the configuration search unit 205 are presented to the user. However, the method of presenting a configuration acquired by the configuration search unit 205 is not limited to such a method. For example, the presenting unit 206 may present to the user the configuration acquired by the configuration search unit 205 as specified values. FIG. 7 illustrates the UI 600 according to such an example. In this example, the defect detectivity parameter retrieved in step S305 is "3" and the noise removal parameter is "2". As illustrated in FIG. 7, the sliders 602 and 603 for selecting the defect detectivity parameter and the noise removal parameter are set to indicate this configuration when the UI 600 is displayed. According to such a configuration, when a shared configuration is used, the operation of the user inputting the configuration can be omitted.

In a method according to another example, the presenting unit 206 may present to the user the configuration acquired by the configuration search unit 205 as specified values that cannot be changed. For example, the configuration acquired by the configuration search unit 205 may be presented to the user as unchangeable values to let the user enter these values as the configuration.

Also, the input unit 207 may receive a user input indicating an adjustment amount for the configuration indicated by the information acquired by the configuration search unit 205. For example, the input unit 207 may acquire a user input indicating an adjustment amount for the recommended value or the specified value for the configuration presented to the user. In this case, the presenting unit 206 may or may not present to the user the configuration acquired by the configuration search unit 205. In this case, the execution unit 208 can execute the defect detection processing on an image of a structure in accordance with the configuration indicated by the information acquired by the configuration search unit 205 and the adjustment amount indicated by the user input.

Specifically, the input unit 207 can adjust the configuration acquired by the configuration search unit 205 according to the input adjustment amount.

Also, in the example described above, the configuration is associated with the attributes of the users as well as combinations of the type of infrastructure construction, the infrastructure construction age, and the type of defect and is stored. However, the method of storing the configuration is not limited to this method. For example, the configuration may be associated with only the user attributes and stored. Also, the configuration may be associated with the user attributes as well as other structure attributes or attributes of the detected defects and stored.

A plurality of pieces of information to be used in configuring the defect detection processing may exist corresponding to a group to which a user belongs. In this case, the input unit 207 may receive user input to select one from the plurality of pieces of information corresponding to the group to which the user belongs. In this case, the execution unit 208 can execute defect detection processing on an image of a structure according to the configuration configured through referring to the information selected in accordance with a user input.

In this case, the configuration storage unit 204 can associate the information to be used in configuring the defect detection processing with the names of information and store them. FIG. 8 illustrates an example of how the configuration storage unit 204 associates configurations with the definition name of configurations and stores them. In the example in FIG. 8, the configurations are associated with the organization ID, and the configuration definition name and stored. In this case, the configuration search unit 205 can use a query for the organization ID and the definition name of the configuration set by the user to search and to retrieve the corresponding configuration. Also, in the example in FIG. 8, the organization IDs and the configuration definition names are associated together. The execution unit 208 can execute the defect detection processing using the configuration retrieved in this manner. In another example, the presenting unit 206 can present the configuration retrieved in this manner is presented to the user, and the execution unit 208 can execute the defect detection processing using the configuration in accordance with a user instruction acquired by the input unit 207 as described above.

FIG. 9 illustrates an example of the UI 400 for receiving a defect detection processing request and for specifying the configuration definition name. Using a form 901, the name associated with the information to be used in configuring the defect detection processing can be presented to the user. In other words, a list of the definition names of the configurations can be displayed in the form 901. Also, using the form 901, the definition names of the configurations can be specified. The list of the definition names of the configurations is a list of the definition names set associated with the organization ID of the organization to which the user belongs, and the reception unit 201 can acquire this from a table such as that illustrated in FIG. 8. According to such a configuration, the definition name corresponding to the user group (for example, organization) can be selected by the user, and thus a configuration appropriate for the user group can be presented to the user. Thus, inspections of structures can be performed with a uniform quality within an organization, and a user can intuitively select a configuration shared within an organization.

Also, in the example described above, a configuration for the defect detection processing with a specific value is associated with the user attributes and stored. However, the format of the stored configuration is not limited to this example. For example, as illustrated in FIG. 10, the configuration storage unit 204 may associate information indicating a settable range for the configuration for the defect detection processing with the user attributes and store these. In the example in FIG. 10, a settable range for the defect detectivity parameter and the noise removal parameter are associated with the organization ID, the type of infrastructure construction, the infrastructure construction age, and the type of defect, and stored.

In such an example, the presenting unit 206 can present to the user the settable range for the configuration for the defect detection processing based on the information acquired by the configuration search unit 205. In this case, the configuration search unit 205 can reference the configuration storage unit 204 and acquire information indicating the settable range. For example, the configuration search unit 205 can search and retrieve the settable range for each configuration using the organization ID, the type of infrastructure construction, the infrastructure construction age, and the type of defect as a query. For example, regarding the organization with an organization ID of "org0001", the settable range for the configuration corresponding to a tunnel, less than ten years old, and crack are from "1" to "5" for the defect detectivity parameter and from "1" to "3" for the noise removal parameter.

FIG. 11 illustrates an example of the UI 600 for presenting to the user the settable range for the configuration to be used in the defect detection processing and acquiring a user input to specify a configuration. In the UI 600, a marker 1101 indicating a settable range for the defect detectivity parameter from "1" to "5" and a marker 1102 indicating a settable range for the noise removal parameter from "1" to "3" are displayed. In this case, the input unit 207 may restrict the configuration for the defect detection processing in accordance with a user input to within the settable range. According to such a configuration, inspections of structures can be performed with a more uniform quality within an organization, and the inspection worker can adjust the defect detection processing parameters taking into account the image characteristics such as imaging environment.

Figure 16:
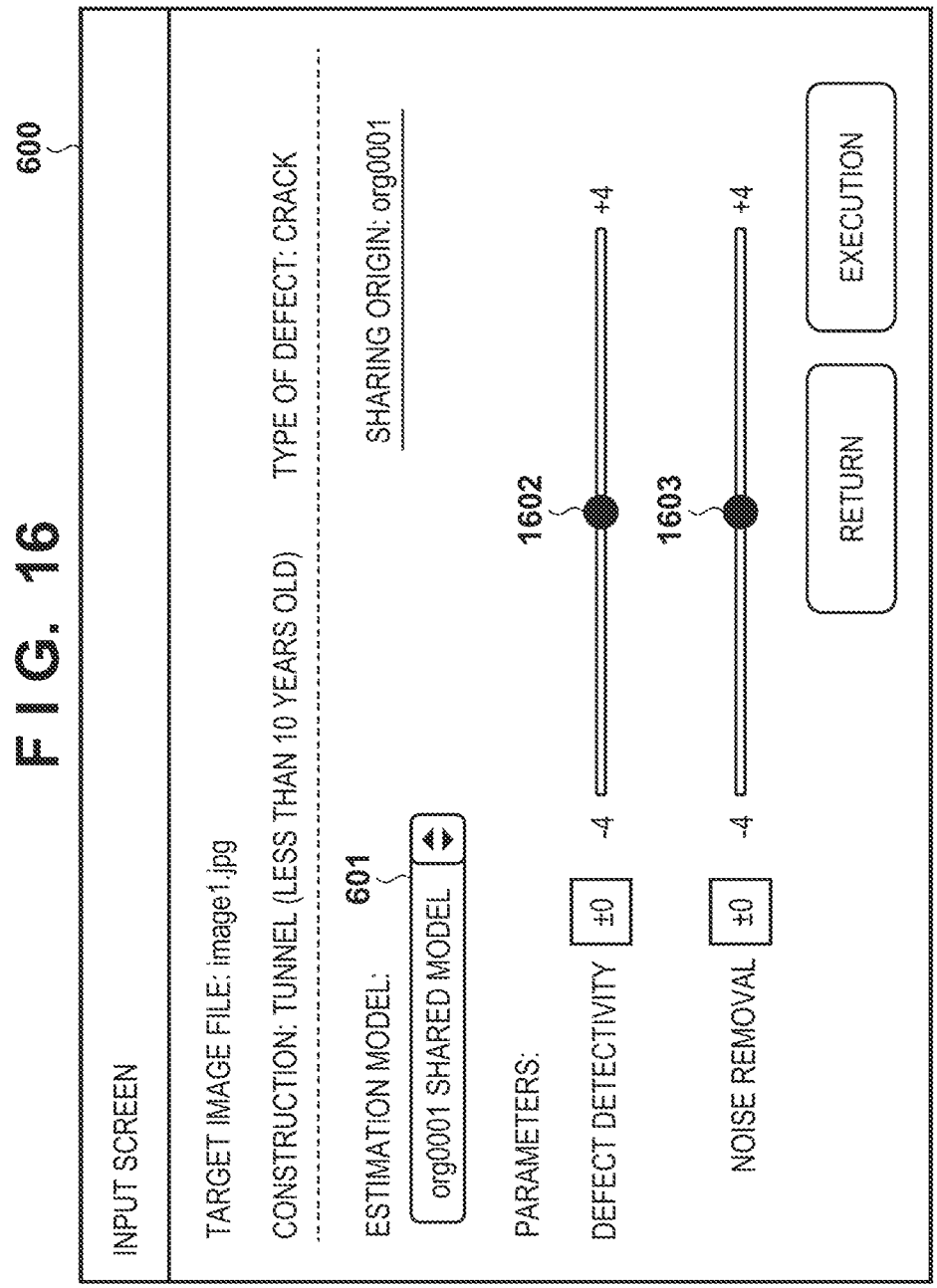
FIG. 16 is a diagram illustrating an example of a screen for inputting a configuration.

Also, the presenting unit 206 may substitute the configuration with another value and present this value to the user. FIG. 16 illustrates an example of the UI 600 for presenting a substituted configuration and acquiring a user input for specifying a configuration. The form 601 is used to select the estimation model to be used in the defect detection processing. However, in FIG. 16, the user is presented with an abstract name "org0001 shared model" instead of the estimation model ID being displayed in detail. Also, in FIG. 16, the recommended values for the defect detectivity parameter and the noise removal parameter, which are shared configurations, are substituted with "+0". The user can enter the defect detectivity parameter and the noise removal parameter using sliders 1602 and 1603 as a relative value using "+0" as a reference value.

The settable range of the relative value may be predetermined. Also, the configuration storage unit 204 may store the settable range of the relative value. Also, depending on the settable range of the configuration stored by the configuration storage unit 204, the input relative value may be scaled. For example, while fixing the range of the relative value to be entered and its resolution, the input relative value may be converted to a configuration so that the maximum value of the range of the relative value to be entered corresponds to the maximum value of the settable range and the minimum value of the range of the relative value corresponds to the minimum value of the settable range.

Sharing Configurations Between Organizations

The configurations described above may be shared, not only within an organization, but between organizations. For example, regarding infrastructure construction inspections, inspections are preferably performed with uniform quality across different organizations, such as subsidiaries and subcontractors. An embodiment relating to sharing and managing configurations for the defect detection processing between organizations will be described below. The configuration and processing of the information processing apparatus according to the present embodiment is similar to the configuration and processing of the embodiment described above illustrated in FIGS. 1 to 3, and thus only the differences will be described below.

In the present embodiment, the configuration storage unit 204 manages the information associated with a plurality of user groups used in configuring the defect detection processing. For example, even when information to be used in configuring the defect detection processing by a user group is registered, other user groups (hereafter, referred to as a user group that shares information or configurations) can use this information. In the example described below, the configuration storage unit 204 stores configurations for the defect detection processing as well as information indicating configuration sharing relationships. The sharing relationship can indicate the relationship between a configuration for the defect detection processing and a user group that shares a configuration. Also, the configuration search unit 205 can search and retrieve the sharing relationship between the group of the user who requested the defect detection processing and the configuration, and can search and retrieve the configuration shared with the group from the configuration storage unit 204. Also, the presenting unit 206 presents to the user the retrieved configuration.

Figures 13, 14:
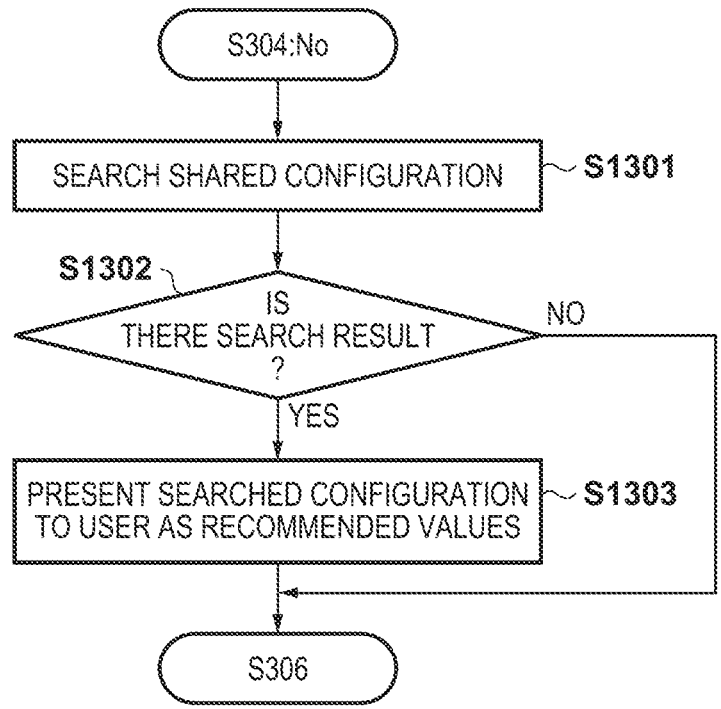
FIG. 13 is a flowchart of processing to search and to retrieve shared configurations.
FIG. 14 is a diagram illustrating an example of a data structure for storing sharing relationships.

Next, the operations of the information processing apparatus according to the present embodiment will be described. In the present embodiment, when a search result is not found in step S304, the processing illustrated in FIG. 13 is executed before proceeding to step S306. In step S1301, the configuration search unit 205 searches and retrieves the configuration shared with the organization of the user who requested the defect detection processing.

FIG. 14 illustrates an example of the information indicating the sharing relationship stored by the configuration storage unit 204. As illustrated in FIG. 14, the configuration storage unit 204 associates combinations of the organization ID, the type of infrastructure construction, the infrastructure construction age, and the type of defect with organization IDs that are targets for sharing and stores them. The configuration search unit 205 can use a query for the organization ID of the organization to which the user belongs and search and retrieve the configuration corresponding to the organization ID through referring to the information indicating the sharing relationship. For example, as illustrated in FIG. 14, the organization with the organization ID of "org1001" shares the configurations "org0001-tunnel-less than ten years old-crack" and "org0001-tunnel-less than 10 years old-exposure of reinforcement". In this example, the configuration search unit 205 can search and retrieve the configuration shared by the organization of the user that corresponds to the type of infrastructure construction, the infrastructure construction age, and the type of the crack specified in step S301. For example, when "tunnel-less than 10 years old-crack" is specified in step S301, the configuration search unit 205 determines that the configuration "tunnel-less than 10 years old-crack" used by the organization "org0001" is shared with the organization "org1001". Thereafter, the configuration search unit 205 can reference a table such as that illustrated in FIG. 5B and acquire the configuration "tunnel-less than 10 years old-crack" used by the organization "org0001".

Figure 15:
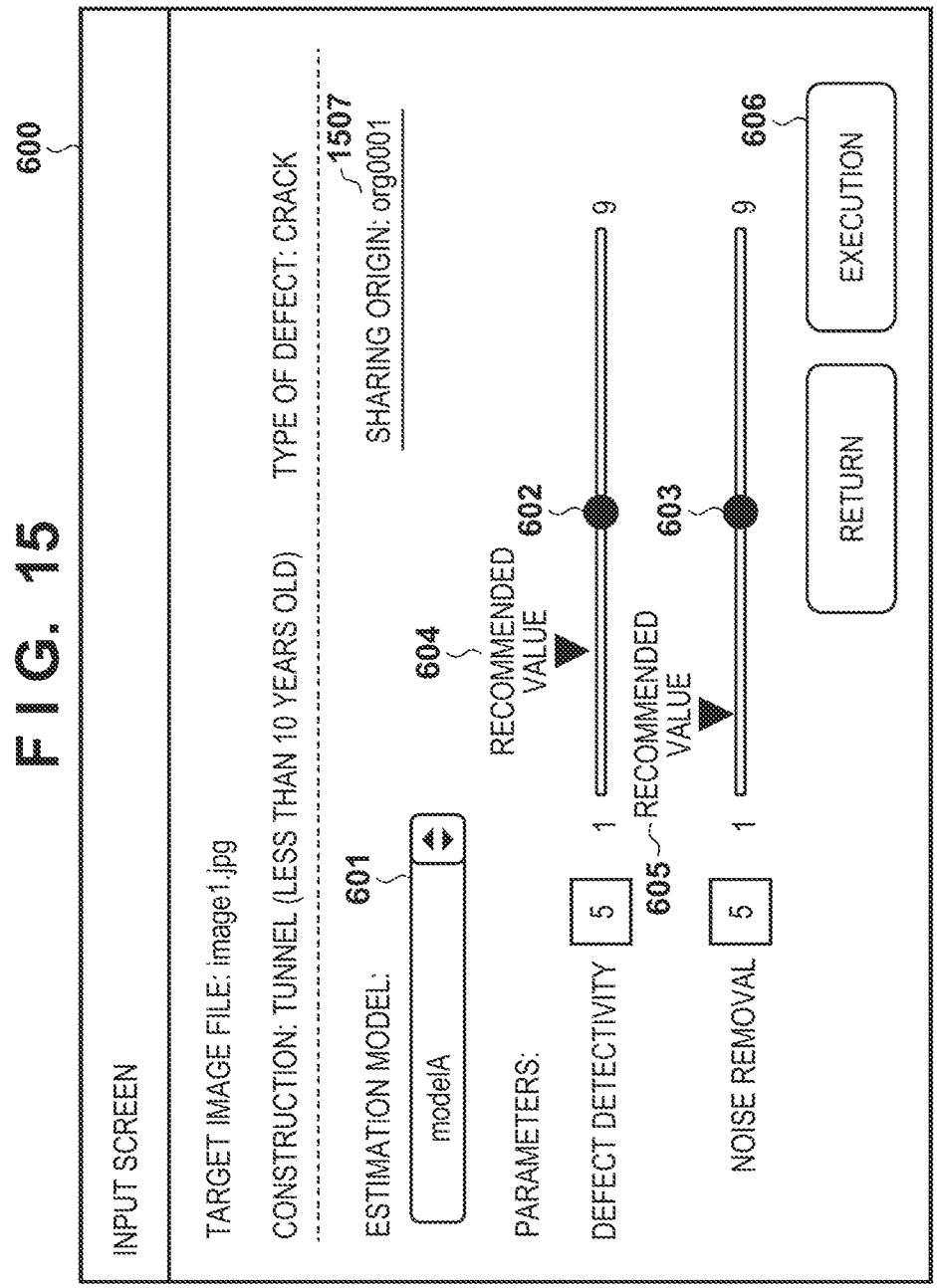
FIG. 15 is a diagram illustrating an example of a screen for inputting a configuration.

Via such processing, when the shared configuration is searched and retrieved, the processing proceeds to step S1303. In step S1303, the presenting unit 206 presents to the user the recommended values for the retrieved configuration in a similar manner to step S305. FIG. 15 illustrates an example according to the present embodiment of the UI 600 for presenting the recommended values for the configuration to be used in the defect detection processing and acquiring a user input to specify a configuration. The UI 600 illustrated in FIG. 15 is similar to that in FIG. 6 except that the recommended values for the shared configurations retrieved in step S1301 are presented and an organization ID 1507 of the organization with the retrieved configuration is displayed.

According to this embodiment, a configuration for the defect detection processing can be shared between organizations and managed. Also, by using a shared configuration in the defect detection processing, inspections of infrastructure constructions can be performed with a more uniform quality across different organizations.

Note that the UI 600 illustrated in FIG. 15 presents the shared configuration to the user directly, but the method of using the shared configuration is not limited to this method. In an embodiment, when using information to be used in configuring the defect detection processing registered by the organization to which the user belongs, this information can be used according to a first mode when setting the configuration for the defect detection processing. For example, when the information registered by the organization to which the user belongs is used, when setting the configuration for the defect detection processing, the user may be presented with the information (for example, the configuration) used in configuring the defect detection processing. On the other hand, when using information to be used in configuring the defect detection processing that is registered by an organization other than the organization of the user and is shared by the organization of the user, this information can be used according to a second mode different from the first mode when setting the configuration for the defect detection processing. For example, when information registered by an organization other than the organization of the user is used, the configuration for the defect detection processing may be configured without presenting the user the information to be used in configuring the defect detection processing. For example, as described above, defect detection processing using a configuration can be executed without presenting the user with the configuration or the configuration can be substituted for a different value, with this value being presented to the user.

In such an embodiment, the configuration storage unit 204 can associate the information to be used in configuring the defect detection processing with a user group that can use the information in a first mode and a user group that can use the information in a second mode and managed these. For example, the user group that can use the information in the first mode is indicated with the organization ID in FIG. 5B, and the user group that can use the information via the second mode is indicated with "sharing organization ID" as illustrated in FIG. 14.

For example, for a user group that shares a configuration, instead of presenting to the user the shared configuration as a recommended value, as illustrated in FIG. 16, a mode can be employed to present to the user the configuration substituted as a different value. According to such a configuration, the original configuration can be prevented from being estimated from the imputable relative value range and the resolution. Accordingly, knowledge relating to configuration adjustment in the organization can be kept confidential from other organizations, while also allowing inspections of infrastructure constructions to be performed with a more uniform quality across different organizations.

For example, for a user group that shares a configuration, instead of presenting to the user the shared configuration as a recommended value, a mode can be employed to use a configuration shared as described above as an unchangeable value in the defect detection processing. According to such a configuration, inspections of infrastructure constructions can be performed with a uniform quality across different organizations, and the quality of inspections being reduced due to users of an organization sharing a configuration making inappropriate changes to the configuration can be suppressed.

Registering a Configuration

Next, an example of a method of registering a configuration as described above will be described. According to the embodiment described below, a configuration for the defect detection processing shared within an organization can be intuitively registered. The configuration of the information processing apparatus according to the present embodiment is similar to the configuration of the embodiment described above illustrated in FIGS. 1 to 3, and thus only the differences will be described below.

The information processing apparatus 100 according to the present embodiment further includes a result selection unit 1701 and a configuration registering unit 1702. The result selection unit 1701 can acquire a user instruction relating to selection of a defect detection processing result stored in the result storage unit 209. The configuration registering unit 1702 associates information used in the defect detection processing with the group to which the user belongs and registers the information on the basis of the user instruction. As described above, the result storage unit 209 can associate the configuration for the defect detection processing with a defect detection processing result and store them. The configuration registering unit 1702 can reference the result storage unit 209 and register, in the configuration storage unit 204, information used in configuring the defect detection processing based on the configuration for the defect detection processing executed to acquire the defect detection processing result specified by the user. Note that the information used in configuring the defect detection processing is not particularly limited to the example described above, and the configuration may be registered in the configuration storage unit 204, or a settable range including the configuration may be registered in the configuration storage unit 204.

Figure 18:
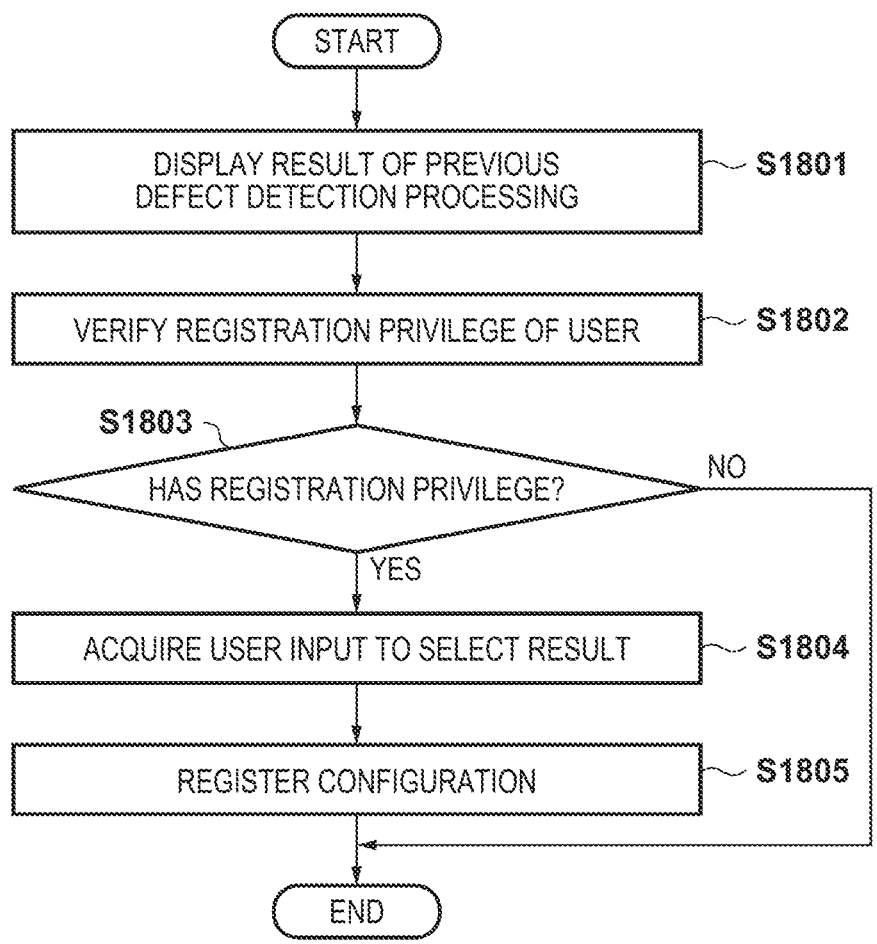
FIG. 18 is a flowchart of processing to register a configuration.

Next, the operations of the information processing apparatus according to the present embodiment will be described with reference the flowchart in FIG. 18. In step S1801, the result selection unit 1701 searches and retrieves the result of a previous defect detection processing associated with the organization the user belongs to from the result storage unit 209 and displays the retrieved result.

FIG. 12A illustrates an example of the results of defect detection processing stored by the result storage unit 209. The result storage unit 209 associates together and stores a result ID, the organization ID, the type of infrastructure construction, the infrastructure construction age, the type of defect, the configuration, result data indicating the processing result, and the execution date and time. The configuration indicates the estimation model ID used in the defect detection processing, the defect detectivity parameter, and the noise removal parameter. The result selection unit 1701 can use the organization ID of the organization of the user, the type of infrastructure construction, and infrastructure construction age, and the type of defect as a query and search and retrieve the associated result data and configuration. For example, the result IDs corresponding to the organization with the organization ID "org0001" and tunnel, less than ten years old, and crack is "res0001", "res0002", and "res0003".

Next, in step S1802, the result selection unit 1701 verifies whether or not the user has the privilege (registration privilege) to register the information used in configuring the defect detection processing. The result selection unit 1701 can verify the user registration privilege through referring to information indicating the registration privileges of users. FIG. 12B illustrates an example of information indicating the registration privileges of users stored by the attribute storage unit 202. In this manner, the attribute storage unit 202 can associate the user ID with the user name, the email address, and the organization ID as well as the information indicating the registration privilege of the user. In this case, the result selection unit 1701 can identify the user ID of the user on the basis of authentication information included in the communication, or the like, and can verify whether or not the user has registration privilege using the user ID as a query. When the user has registration privilege, the processing proceeds to step S1804, and when the user doesn't, the processing ends.

In step S1804, the result selection unit 1701 acquires a user input from the user to select a defect detection processing result. Next, in step S1805, the configuration registering unit 1702 registers the configuration associated with the defect detection processing result selected in step S1804 in the configuration storage unit 204 (the table illustrated in FIG. 5B, for example). For example, when the result with the result ID "res0002" is selected, for the configuration corresponding the organization ID "org0001", tunnel, less than 10 years old, and crack, "model A" for the estimation model, "5" for the defect detectivity parameter, and "3" for the noise removal parameter are registered.

Also, FIG. 17 illustrates an example of a UI 2000 displayed on a terminal used by the user for displaying the previous defect detection processing result displayed in step S1801 and acquiring a user input to select a result in step S1804. A form 2001 is used to specify a category (type of infrastructure construction, age, and type of defect) of previous defect detection processing that is the target for display. A form 2002 displays a list of previous defect detection processing results corresponding to the specified category. Also, in the form 2002, the user can select one of the displayed results. In a preview screen 2003, a preview of the result selected via the form 2002 is displayed. A checkbox 2004 is used for switching between filtering and not filtering the results displayed in the form 2002. In this example, when a defect detection processing result for an image is selected in the form 2002, the results are filtered so that only the results of the defect detection processing executed on the same image are displayed in the form 2002. When a button 2005 is pressed, the configuration used to obtain the defect detection processing result selected in the form 2002 is registered in the configuration storage unit 204.

According to the embodiment described below, a configuration for the defect detection processing shared within an organization can be intuitively registered. Note that the user may register a configuration without the privileges of the user being verified. According to such a method, configurations shared within an organization can be managed in a flexible manner.

Note that the information processing apparatus described above may be constituted of a plurality of apparatuses. For example, an information processing apparatus according to an embodiment may be constituted of a plurality of information processing apparatuses connected via a network. In particular, when the information processing apparatus 100 is a server that receives requests from a user terminal, the function of the execution unit 208 may be executed by another server. According to such a configuration, even when the processing by the execution unit 208 takes time, the processing by the execution unit 208 can be executed asynchronously with a request. Also, a user terminal may include the processing units, such as the reception unit 201, the presenting unit 206, and the input unit 207, that execute user input/output operations. Furthermore, the functions of the information processing apparatus illustrated in FIG. 2 can be implemented by a computer. However, a portion of or all of the functions of the information processing apparatus may be implemented by dedicated hardware.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising one or more processors and one or more memories storing one or more programs that cause the one or more processors:

to determine a group to which a user belongs, wherein the user has requested defect detection processing on an image of a structure;

to acquire information to be used in configuring the defect detection processing, the information corresponding to the determined group to which the user belongs;

to execute the defect detection processing on the image of the structure on a basis of a configuration for the defect detection processing configured through referring to the information acquired; and to acquire the information to be used in configuring the defect detection processing through referring to a storage, the information corresponding to the determined group to which the user belongs, wherein the storage manages information to be used in configuring the defect detection processing in association with a group of a user, the storage manages the information to be used in configuring the defect detection processing in association with a plurality of groups of the user, and the storage manages the information to be used in configuring the defect detection processing in association with a user group that can use the information to be used in configuring the defect detection processing in a first mode when setting the configuration of the defect detection processing and in association with a user group that can use the information to be used in configuring the defect detection processing in a second mode different from the first mode when setting the configuration of the defect detection processing.

2. The information processing apparatus according to claim 1, wherein the one or more programs further cause the one or more processors:

to present to the user the information acquired;

to receive a user input indicating the configuration for the defect detection processing after the information is presented to the user; and to execute the defect detection processing on the image of the structure on a basis of the configuration indicated by the user input.

3. The information processing apparatus according to claim 2, wherein the one or more programs further cause the one or more processors to present to the user at least one of a recommended value or an initial value for the configuration for the defect detection processing on a basis of the information acquired.

4. The information processing apparatus according to claim 2, wherein the one or more programs further cause the one or more processors:

to present to the user a settable range for the configuration for the defect detection processing on a basis of the information acquired, and to restrict the configuration for the defect detection processing indicated by the user input within the settable range.

5. The information processing apparatus according to claim 2, wherein the one or more programs further cause the one or more processors to present to the user a user interface including a region for a display based on the information acquired and a region for receiving the user input indicating the configuration for the defect detection processing.

6. The information processing apparatus according to claim 1, wherein the one or more programs further cause the one or more processors to execute the defect detection processing on the image of the structure on a basis of a configuration indicated by the information acquired.

7. The information processing apparatus according to claim 6, wherein the one or more programs cause the one or more processors:
   to receive a user input indicating an adjustment amount for the configuration indicated by the information acquired; and
   to execute the defect detection processing on the image of the structure on a basis of the configuration indicated by the information acquired and the adjustment amount indicated by the user input.

8. The information processing apparatus according to claim 1, wherein the one or more programs cause the one or more processors:
   to receive a user input to select one from a plurality of pieces of information to be used in configuring the defect detection processing, the plurality of pieces of information corresponding to the group which the user belongs to; and
   to execute the defect detection processing on the image of the structure on a basis of a configuration set through referring to the piece of information selected by the user input.

9. The information processing apparatus according to claim 8, wherein the one or more programs further cause the one or more processors to present to the user a name associated with the piece of information to be used in configuring the defect detection processing.

10. The information processing apparatus according to claim 6, wherein the one or more memories store a result of the defect detection processing in association with the configuration for the defect detection processing,
   the one or more programs further cause the one or more processors to register the information to be used in configuring the defect detection processing in association with the group to which the user belongs on a basis of an instruction by the user, the instruction by the user including designation of a result of the defect detection processing stored in the one or more memories, and
   the one or more programs further cause the one or more processors to register the information to be used in configuring the defect detection processing that is based on the configuration of the defect detection processing executed to obtain the result of the defect detection processing designated by the user.

11. The information processing apparatus according to claim 10, wherein the one or more programs further cause the one or more processors to verify whether or not the user has a privilege to register the information to be used in configuring the defect detection processing.

12. The information processing apparatus according to claim 1, wherein the group of the user is set depending on an attribute of the user, and the attribute of the user is information indicating an organization to which the user belongs.

13. The information processing apparatus according to claim 1, wherein the information to be used in configuring the defect detection processing includes information for identifying an estimation model to be used in the defect detection processing.

14. The information processing apparatus according to claim 1, wherein the information to be used in configuring the defect detection processing includes a parameter for the defect detection processing or a parameter for image processing to be executed on the image of the structure.

15. The information processing apparatus according to claim 14, wherein the information to be used in configuring the defect detection processing includes a parameter for controlling detectivity of defects in the defect detection processing or a parameter for noise removal processing to be executed on the image of the structure.

16. The information processing apparatus according to claim 1, wherein the storage manages the information to be used in configuring the defect detection processing in association with the group of the user and with a type of defect to be detected or a characteristic of the structure, and
   wherein the one or more programs further cause the one or more processor to acquire the information to be used in configuring the defect detection processing corresponding to the group to which the user belongs and a type of defect to be detected or a characteristic of the structure.

17. The information processing apparatus according to claim 16, wherein the characteristic of the structure indicates at least one of a type of the structure or an age of the structure.

18. The information processing apparatus according to claim 1, wherein, in the first mode, the information to be used in configuring the defect detection processing is presented to the user when setting the configuration of the defect detection processing, and,
   in the second mode, the configuration for the defect detection processing is set without presenting to the user the information to be used in configuring the defect detection processing.

19. An information processing method comprising:
   determining a group to which a user belongs, wherein the user has requested defect detection processing on an image of a structure;
   acquiring information to be used in configuring the defect detection processing through referring to a storage, the information corresponding to the determining group to which the user belongs, wherein the storage manages information to be used in configuring the defect detection processing in association with a group of a user; and
   executing the defect detection processing on the image of the structure on a basis of a configuration for the defect detection processing configured through referring to the information acquired,
   wherein the storage manages the information to be used in configuring the defect detection processing in association with a plurality of groups of the user, and the storage manages the information to be used in configuring the defect detection processing in association with a user group that can use the information to be used in configuring the defect detection processing in a first mode when setting the configuration of the defect detection processing and in association with a user group that can use the information to be used in configuring the defect detection processing in a second mode different from the first mode when setting the configuration of the defect detection processing.

20. A non-transitory computer-readable medium storing one or more programs that, when executed by a computer comprising one or more processors and one or more memories, cause the computer:
   to determine a group to which a user belongs, wherein the user has requested defect detection processing on an image of a structure;
   to acquire information to be used in configuring the defect detection processing through referring to a storage, the information corresponding to the determined group to which the user belongs, wherein the storage manages information to be used in configuring the defect detection processing in association with a group of a user; and to execute the defect detection processing on the image of the structure on a basis of a configuration for the defect detection processing configured through referring to the information acquired, wherein the storage manages the information to be used in configuring the defect detection processing in association with a plurality of groups of the user, and the storage manages the information to be used in configuring the defect detection processing in association with a user group that can use the information to be used in configuring the defect detection processing in a first mode when setting the configuration of the defect detection processing and in association with a user group that can use the information to be used in configuring the defect detection processing in a second mode different from the first mode when setting the configuration of the defect detection processing.

* * * * *